US012508696B2

(12) United States Patent
Beer

(10) Patent No.: US 12,508,696 B2
(45) Date of Patent: Dec. 30, 2025

(54) FLEXIBLE HEAD JOINTS FOR CORDLESS RATCHET TOOLS

(71) Applicant: Snap-on Incorporated, Kenosha, WI (US)

(72) Inventor: Joshua M. Beer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/373,798

(22) Filed: Sep. 27, 2023

(65) Prior Publication Data

US 2024/0017383 A1 Jan. 18, 2024

Related U.S. Application Data

(63) Continuation of application No. 17/229,179, filed on Apr. 13, 2021, now Pat. No. 11,806,844.

(51) Int. Cl.

*B25B 23/00* (2006.01)
*B25B 13/48* (2006.01)
*B25B 21/00* (2006.01)

(52) U.S. Cl.

CPC ........ *B25B 23/0014* (2013.01); *B25B 13/481* (2013.01); *B25B 21/004* (2013.01)

(58) Field of Classification Search

CPC . B25B 21/004; B25B 23/0014; B25B 13/481; B25B 23/0028; B25B 21/002; B25G 1/025; B25G 1/063; B25G 1/066; B25F 3/00; B25F 23/0014; B25F 23/0028; B23Q 5/045; F16D 3/38

USPC ......... 81/57.39, 177.8, 177.9, 177.7, 177.75, 81/177.85

See application file for complete search history.

(56) References Cited

U.S. PATENT DOCUMENTS

| | | | |
|---|---|---|---|
| 1,016,607 | A | 2/1912 | Booman |
| 1,417,390 | A | 5/1922 | Krumsick |
| 1,431,389 | A | 10/1922 | Frisz |
| 1,498,712 | A | 6/1924 | York |
| 1,498,713 | A | 6/1924 | York |

(Continued)

FOREIGN PATENT DOCUMENTS

| | | |
|---|---|---|
| CN | 103659681 | 3/2014 |
| CN | 103831769 | 6/2014 |

(Continued)

OTHER PUBLICATIONS

Australian Office Action for corresponding AU Application No. 2022202257, dated Jan. 15, 2024, 4 pages.

(Continued)

*Primary Examiner* — Brian D Keller
*Assistant Examiner* — Sidney D Full
(74) *Attorney, Agent, or Firm* — Taft, Stettinius & Hollister LLP

(57) ABSTRACT

A flexible head joint for a tool, such as a motorized ratcheting-type tool. The flexible joint also allows an output mechanism of the tool, such as a ratchet head, to be disposed at an angle with respect to a housing to the tool, which houses a motor. For example, the first shaft is pivotably coupled to a first connector, which may have a tongue shaped portion. The second shaft is pivotably coupled to a second connector, which may have a slotted portion adapted to receive the tongue portion. This provides two pivot points that have parallel axes.

19 Claims, 6 Drawing Sheets

(56) References Cited

U.S. PATENT DOCUMENTS

| | | | | |
|---|---|---|---|---|
| 2,436,336 | A | 2/1948 | Slater | |
| 2,498,465 | A * | 2/1950 | Thomas | B25B 13/481 403/57 |
| 2,570,706 | A | 10/1951 | Peluse | |
| 2,978,938 | A | 4/1961 | Nalley | |
| 4,334,445 | A | 6/1982 | Timewell | |
| 4,748,872 | A | 6/1988 | Brown | |
| 5,188,189 | A * | 2/1993 | Hummel | B25G 1/066 81/177.8 |
| 5,251,706 | A | 10/1993 | Evans | |
| 5,305,668 | A | 4/1994 | Davis | |
| 5,784,934 | A | 7/1998 | Izumisawa | |
| 5,943,925 | A | 8/1999 | Huang | |
| 6,050,989 | A | 4/2000 | Adams et al. | |
| 6,186,033 | B1 | 2/2001 | Faro, Sr. | |
| 6,311,583 | B1 | 11/2001 | Izumisawa | |
| 6,412,374 | B1 | 7/2002 | Hsieh | |
| 6,435,060 | B1 | 8/2002 | Izumisawa | |
| 6,928,902 | B1 | 8/2005 | Eyssallenne | |
| 6,935,212 | B2 | 8/2005 | Wadsworth | |
| 7,171,876 | B2 | 2/2007 | Chen et al. | |
| 7,343,837 | B1 | 3/2008 | Domanico | |
| 8,448,545 | B1 | 5/2013 | Argyle | |
| 8,650,992 | B2 * | 2/2014 | Neitzell | B25B 13/481 81/177.85 |
| 10,532,448 | B2 * | 1/2020 | Huddy | B25B 23/0028 |
| 2004/0226418 | A1 | 11/2004 | Honniball | |
| 2005/0229752 | A1 * | 10/2005 | Nickipuck | B25B 23/0014 81/177.75 |
| 2006/0288822 | A1 | 12/2006 | Langas | |
| 2007/0234854 | A1 * | 10/2007 | Collins | B25B 21/004 81/58.1 |
| 2012/0266709 | A1 * | 10/2012 | Wang | B25F 3/00 74/417 |
| 2014/0033881 | A1 * | 2/2014 | Hon | B25B 23/1427 81/177.8 |
| 2016/0222904 | A1 | 8/2016 | Yang et al. | |
| 2016/0229040 | A1 | 8/2016 | Yang et al. | |
| 2018/0283460 | A1 | 10/2018 | Lock | |
| 2019/0084131 | A1 | 3/2019 | Yang | |

FOREIGN PATENT DOCUMENTS

| | | | |
|---|---|---|---|
| CN | 210524938 | U | 5/2020 |
| DE | 102015118667 | | 5/2017 |
| GB | 1390926 | | 4/1975 |
| GB | 2560170 | A | 9/2018 |
| JP | 2013121653 | A | 6/2013 |
| KR | 200357030 | | 7/2004 |
| KR | 20080000602 | | 4/2008 |
| TW | 348096 | B | 12/1998 |
| TW | 201114554 | A | 5/2011 |
| WO | 2015048562 | A1 | 4/2015 |

OTHER PUBLICATIONS

Taiwan Office Action for corresponding Application No. 11120857410 dated Sep. 1, 2022, 13 pages.

Combined Search and Examination Report for corresponding Application No. GB2204902.7 dated May 31, 2022, 7 pages.

Australian Patent Office, Examination Report No. 1 issued in corresponding Application No. 2024201878, dated Mar. 18, 2025, 3 pp.

Chinese Patent Office, First Office Action issued in corresponding Application No. 202210383873.X, dated Nov. 29, 2024, 12 pp.

UK Intellectual Property Office, Examination Report issued in corresponding Application No. GB2318653.9, dated Mar. 5, 2024, 3 pp.

* cited by examiner

FLEXIBLE HEAD JOINTS FOR CORDLESS RATCHET TOOLS

CROSS REFERENCES TO RELATED APPLICATIONS

This application is a continuation of, and claims the priority benefit to, U.S. patent application Ser. No. 17/229,179, filed Apr. 13, 2021, the contents of which are incorporated herein by reference in their entirety.

TECHNICAL FIELD OF THE INVENTION

The present invention relates to flexible head joints for hand-held tools, and more particularly, to flexible joints for cordless ratchet tools.

BACKGROUND OF THE INVENTION

Power hand tools, such as, for example, motorized ratchet wrenches and drivers, are commonly used in automotive, industrial, and household applications to install and remove threaded fasteners and apply a torque and/or angular displacement to a work piece, such as a threaded fastener, for example. Power hand tools such as cordless power ratchets and drivers generally include an electric motor contained in a clamshell type housing, along with other components, such as switches, light emitting diodes (LEDs), and batteries, for example. The clamshell housing generally includes two or more housing portions fastened together by fasteners such as screws or rivets.

Power hand tools, such as, for example, motorized ratchet wrenches and drivers, include a ratcheting type head that is driven by the electric motor. However, the head is generally fixed in a position relative to the tool body due to the necessity to place the motor in the housing. The fixed nature of the head can make it difficult to reach fasteners and other work pieces located in tight or otherwise hart to reach places.

SUMMARY OF THE INVENTION

The present invention relates broadly to a flexible head joint for a tool, such as a motorized ratcheting-type tool. The flexible joint also allows an output mechanism of the tool, such as a ratchet head, to be disposed at an angle relative to a housing to the tool, which houses a motor and other components. The flexible head joint couples first and second shafts of the tool together. The first shaft is pivotably coupled to a first connector, which may have a tongue shaped portion. The second shaft is pivotably coupled to a second connector, which may have a slotted portion adapted to receive the tongue portion. This provides two pivot points that have parallel axes. The first shaft may also rotate during operation of the tool to provide rotational force to an output mechanism of the tool. The second shaft also rotates during operation of the tool and receives rotational force via an electric or pneumatic motor disposed in a tool housing. Thus, the motor rotates the second shaft, which rotates the first shaft via the flexible joint.

In an embodiment, the present invention broadly relates to a tool. The tool includes a tool housing adapted to house a motor. A first head housing portion is coupled to the tool housing. A second head housing portion is pivotably coupled to the first head housing portion. A first shaft is disposed in the first head housing portion and is operably coupled to the motor. A second shaft is disposed in the second housing portion. A first connector is pivotably coupled to the first shaft, and a second connector is coupled to the first connector and pivotably coupled to the second shaft.

In another embodiment, the present invention broadly relates to a head joint for a tool. The head joint includes a first head housing portion, and a second head housing portion pivotably coupled to the first head housing portion. A first shaft is disposed in the first head housing portion, and a second shaft is disposed in the second housing portion. A first connector is pivotably coupled to the first shaft, and a second connector is coupled to the first connector and pivotably coupled to the second shaft.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
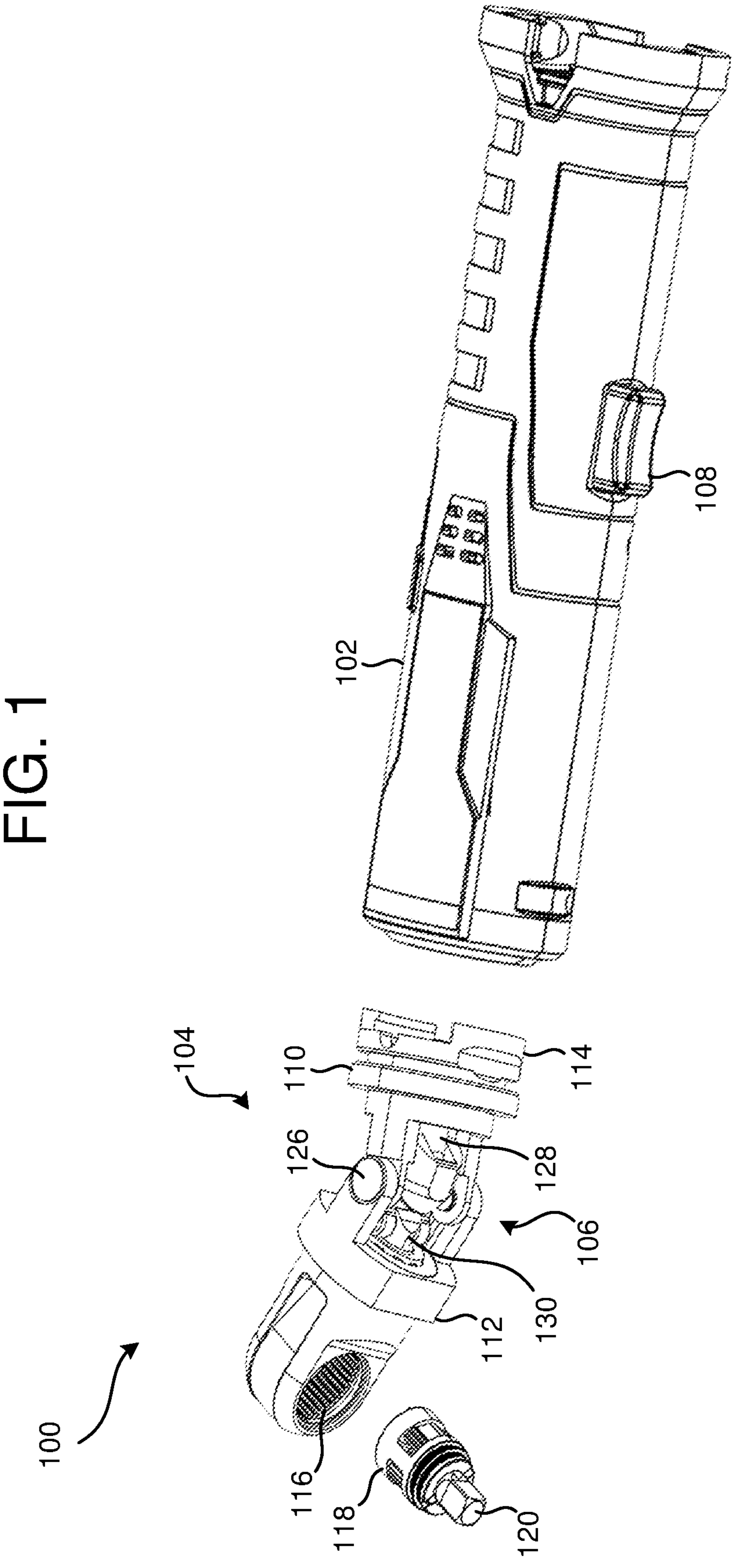
FIG. 1 is a partially exploded, disassembled perspective side view of an exemplar tool, according to an embodiment of the present invention.
Figure 2:
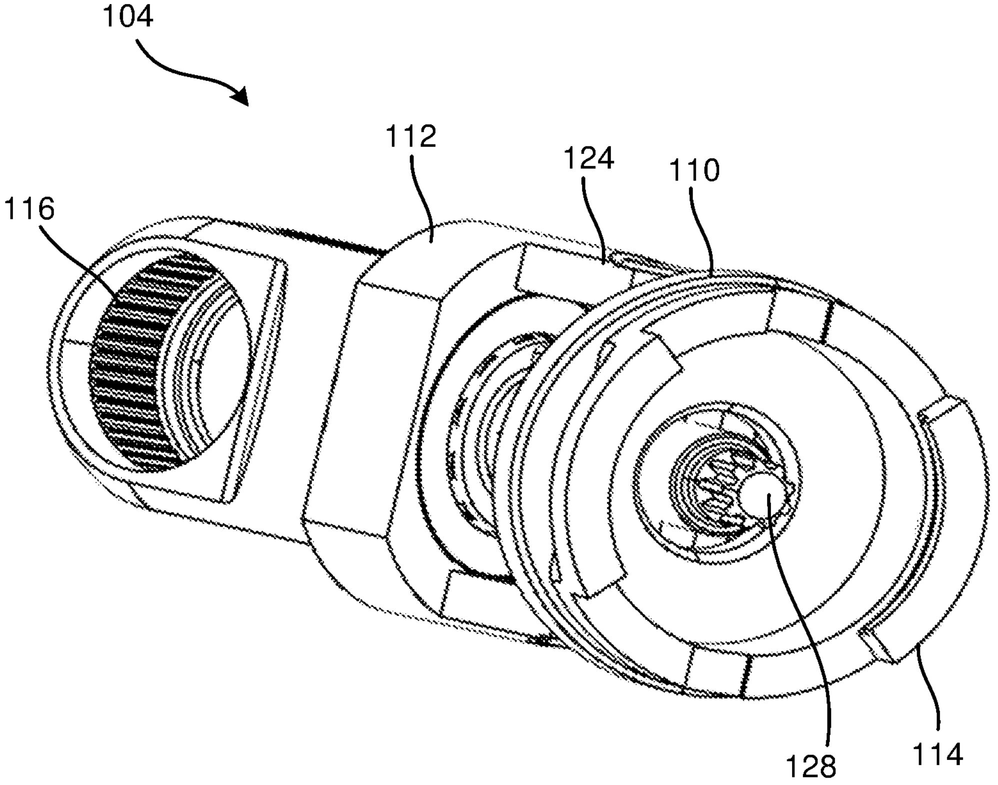
FIG. 2 is a first perspective view of a ratcheting-type head, according to an embodiment of the present invention.
Figure 3:
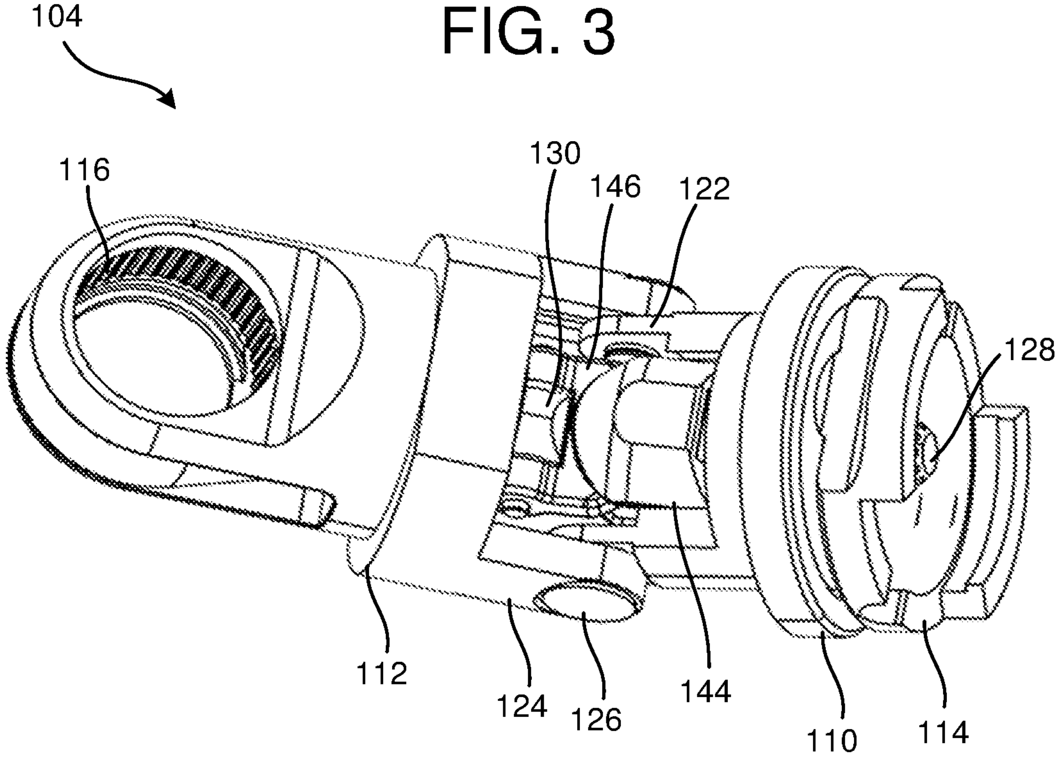
FIG. 3 is a second perspective view of the ratcheting-type head of the tool of FIG. 2, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a flexible head joint for a tool, such as, for example, a motorized ratcheting-type tool. The flexible joint allows an output mechanism of the tool, such as a ratchet head, to be disposed at an angle relative to a housing to the tool, which houses a motor and other components. The flexible head joint couples first and second shafts of the tool together. The first shaft is pivotably coupled to a first connector, which may have a tongue shaped portion. The second shaft is pivotably coupled to a second connector, which may have a slotted portion adapted to receive the tongue portion. This provides two pivot points that have parallel axes. The first shaft may rotate during operation of the tool to provide rotational force to an output mechanism of the tool. The second shaft also rotates during operation of the tool and receives rotational force via an electric or pneumatic motor disposed in a tool housing. Thus, the motor causes the second shaft to rotate, which causes the first shaft to rotate via the flexible joint.

Referring to FIG. 1, a tool 100, such as a cordless ratchet-type tool, includes a main tool housing 102 and a ratchet head assembly 104 including a flexible joint 106. The tool housing 102 may include first and second housing portions that are coupled together in a clamshell type manner and securely coupled to the ratchet head assembly 104. The tool housing 102 may enclose or house an electric or pneumatic motor, a switch assembly, display with buttons for configuring and setting the tool, one or more status indicators such as light emitting diodes, and other components for operation of the tool, for example. The tool housing 102 may also include a textured or knurled grip to improve a user's grasp of the tool 100 during use.

In an embodiment, the tool 100 includes a trigger 108 that can be actuated by a user to cause the tool 100 to operate. For example, the user can depress the trigger 108 inwardly to selectively cause power to be drawn from a power source and cause a motor to provide torque to the ratchet head assembly 104 in a desired rotational direction. Any suitable trigger 108 or switch can be implemented without departing from the spirit and scope of the present invention. For example, the trigger 108 may also be biased such that the trigger 108 is inwardly depressible, relative to the tool 100, to cause the tool 100 to operate, and a release of the trigger 108 causes the trigger 108 to move outwardly, relative to the tool 100, to cease operation of the tool 100 via the biased nature of the trigger 108. The trigger 108 and switch mechanism may also be a variable speed type mechanism. In this regard, actuation or depression of the trigger 108 causes the motor to operate at a faster speed the further the trigger 108 is depressed.

The ratchet head assembly 104 includes first and second ratchet housing portions 110, 112 that are pivotably coupled together. The first ratchet housing portion 110 may include a coupling portion 114 adapted to couple to the tool housing 102. The second ratchet housing 112 may include a gear 116 disposed therein that is adapted to engage a work piece, such as a nut, bolt, or other fastener, and/or the second ratchet housing portion 112 may be adapted to receive and operably engage a drive portion 118 including a drive lug 120, for example. The drive portion 118 is adapted to apply torque to a work piece, such as a fastener, via an adapter, bit, or socket coupled to the drive lug 120, such as a bi-directional ratcheting square or hexagonal drive. As illustrated, the drive lug 120 is a "male" connector designed to fit into or matingly engage a female counterpart. However, the drive portion 118 may alternatively include a "female" connector designed to matingly engage a male counterpart. The drive portion 118 may also be structured to directly engage a work piece without requiring coupling to an adapter, bit, or socket. The rotational direction of the drive portion 118 and/or gear 116 can be selected by rotation of a selector switch to be either a first or second rotational direction (such as, clockwise or counterclockwise).

The motor may be disposed in the tool housing 102 and be adapted to operably engage the ratchet head assembly 104, and provide torque to the tool 100 and, in turn, to the drive portion 118 and/or gear 116. The motor may be a brushless or brushed type motor, or any other suitable motor. A power source (not shown) can be associated with the tool 100 to provide electronic or other forms of power to the tool 100, such as, for example, electric, hydraulic, or pneumatic, to operate the motor. In an embodiment, the power source can be housed in an end of the tool housing 102, opposite the ratchet head assembly 104, a midsection of the tool 100, or any other portion of the tool 100/tool housing 102. The power source may also be an external component that is not housed by the tool 100, but that is operatively coupled to the tool 100 through, for example, wired or wireless means. In an embodiment, the power source is a removable and rechargeable battery that is adapted to be disposed in the end of the tool housing 102 and electrically couple to corresponding terminals of the tool 100.

Referring to FIGS. 2-5, the first ratchet housing portion 110 incudes first arms 122, and the second ratchet housing portion 112 includes second arms 124. The first and second arms 122, 124 are adapted to pivotably couple to each other, for example, via fasteners 126. The fasteners 126 may be pins, rivets, threaded fasteners, or other fastener that provide for a pivotable connection between the first and second arms 122, 124. This pivotable coupling allows for the first and second ratchet housing portions 110, 112 to pivot with respect to one another.

As shown in FIG. 1, the pivotable coupling allows for the first and second ratchet housing portions 110, 112 to pivot around a first axis extending through the fasteners 126, which is substantially perpendicular to a second axis extending through the drive portion 118 or a longitudinal axis of the tool housing 102. This also allows the second ratchet housing portion 112 to pivot with respect to the tool housing 102.

Referring to FIGS. 2-5, a first shaft 128 is disposed in the first ratchet housing portion 110, and a second shaft 130 is disposed in the second ratchet housing portion 112. The first shaft 128 includes opposing first and second ends. The first end includes gear teeth 132 adapted to operably couple to a motor shaft of a motor disposed in the tool housing 102. The second end includes a through hole 134 adapted to receive a first pin 136.

Similarly, the second shaft 130 includes opposing first and second ends. The first end 138 is adapted to operably couple to the gear 116. The second end includes a through hole 140 adapted to receive a second pin 142.

The first and second shafts 128, 130 are also pivotably coupled to first and second connectors 144, 146 to form the joint 106. For example, the first shaft 128 is pivotably coupled to the first connector 144 via the first pin 136, and the second shaft 130 is pivotably coupled to the second connector 146 via the second pin 142. Referring to FIGS. 4-8, the first connector 144 includes a recess 148 forming arms 150 with through holes 152 adapted to receive the first pin 136. The first shaft 128 may be disposed in the recess 148 (between the arms 150) with the through holes 134 aligned with the through holes 152 of the first connector 144, and the first pin 136 may be disposed in the through holes 134 and 152 to pivotably couple the first shaft 128 to the first connector 144.

The second connector 146 includes a recess 154 forming arms 156 with through-holes 158 adapted to receive the second pin 146. The second shaft 130 may be disposed in the recess 154 (between the arms 156) with the through-holes 140 substantially axially aligned with the through-holes 158 of the second connector 146, and the second pin 142 may be disposed in the through-holes 140 and 158 to pivotably couple the second shaft 130 to the second connector 146.

The first connector 144 may also include a recess, groove, or slot 160 at an end opposite the arms 150. The second connector 146 may include a corresponding protrusion (or tongue portion) 162 at an end opposite the arms 156. The protrusion 162 is adapted to matingly engage and/or be disposed in the slot 160. This allows torque to be transferred from the motor to the first shaft 128 to rotate the first shaft 128, which thereby rotates the first connector 144. The first connector 144 rotates the second connector 146 via the mating engagement between the first and second connectors 144, 146. The second connector 146 also rotates the second shaft 130, which causes the gear 116 and/or drive portion 118 to provide output torque.

As illustrated, the first and second pins 136, 142 provide first and second pivots around parallel axes. This allows the first and second shafts 128, 130 to pivot about the respective first and second parallel pivots. The pivotable coupling between the first and second ratchet housing portions 110 is also substantially parallel relative to the axes formed by the first and second pins 136, 142 to allow for the pivotable movement between of the first and second ratchet housing portions 110.

While the first connector 144 is described as including the slot 160 and the second connector 146 is described as including the protrusion (or tongue portion) 162, the first connector 144 may include the protrusion 162 and the second connector 146 may include the slot 160. Similarly, the first shaft 128 may include a recess and arms to couple to the first connector, and the second shaft 130 may include the recess and arms to couple to the second connector.

Figure 4:
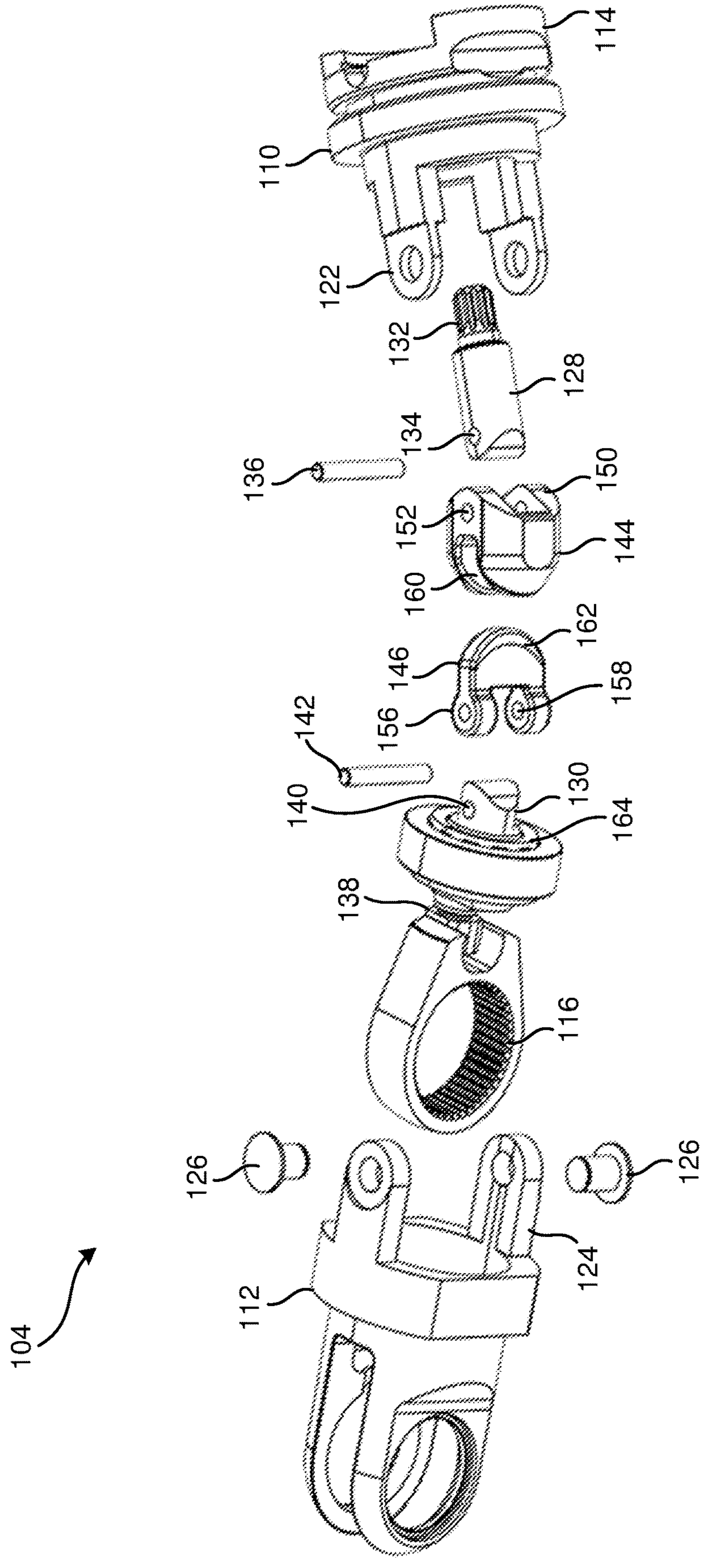
FIG. 4 is a first perspective exploded, disassembled view of the ratcheting-type head of the tool of FIG. 2, according to an embodiment of the present invention.
Figure 5:
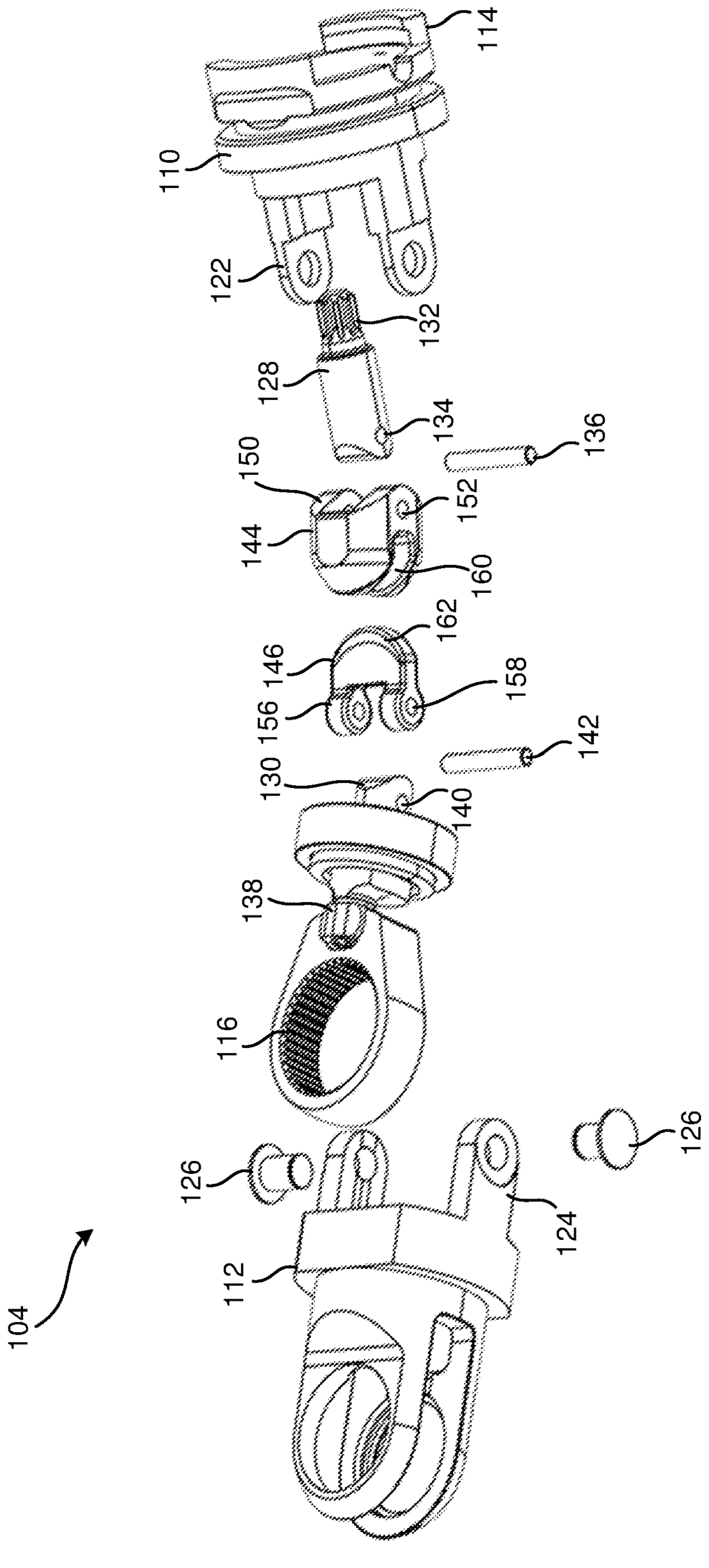
FIG. 5 is a second perspective exploded, disassembled view of the ratcheting-type head of the tool of FIG. 2, according to an embodiment of the present invention.
Figure 6:
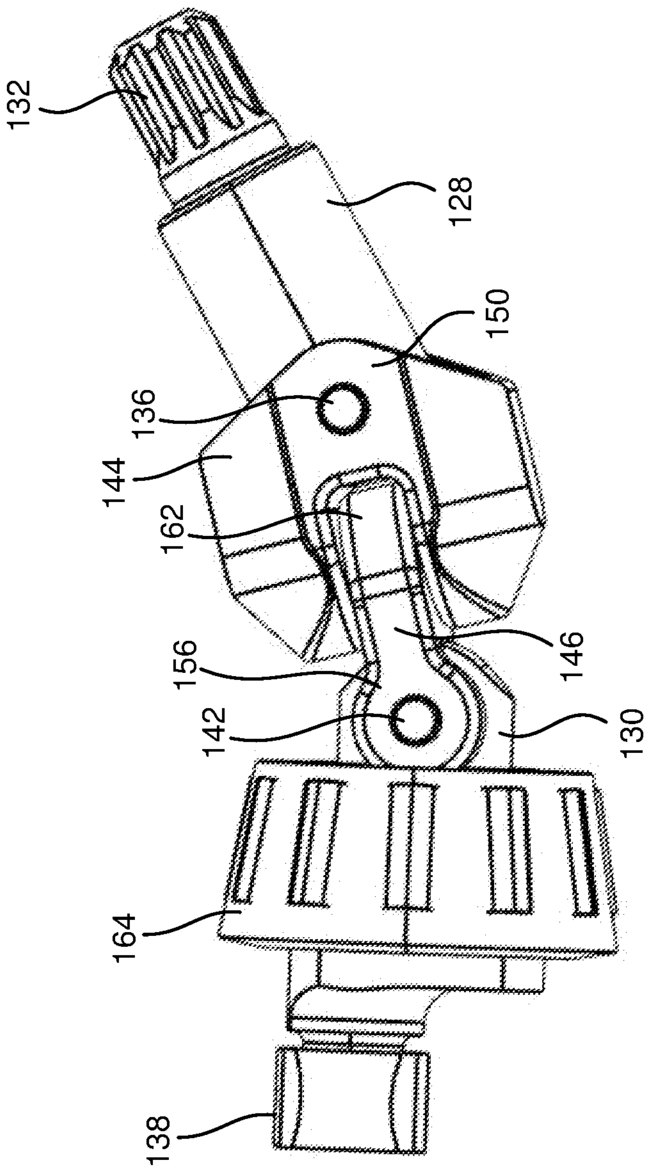
FIG. 6 is a perspective view of a flexible joint and shafts of the ratcheting-type head of FIG. 2, according to an embodiment of the present invention.
Figure 7:
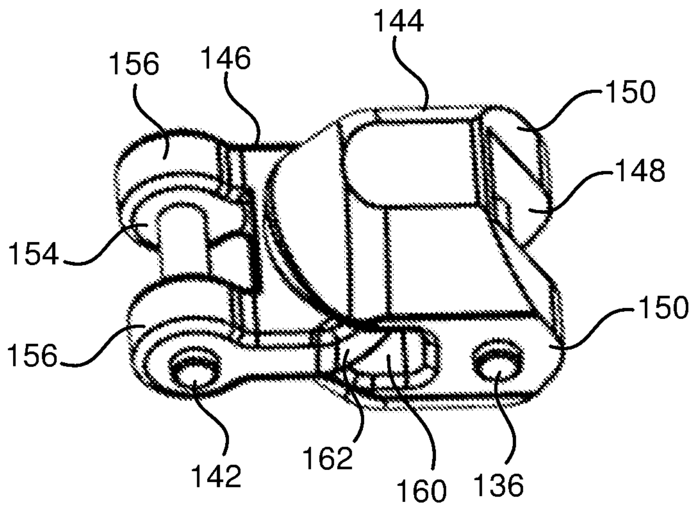
FIG. 7 is a perspective view of a flexible joint of the ratcheting-type head of FIG. 2, according to an embodiment of the present invention.
Figure 8:
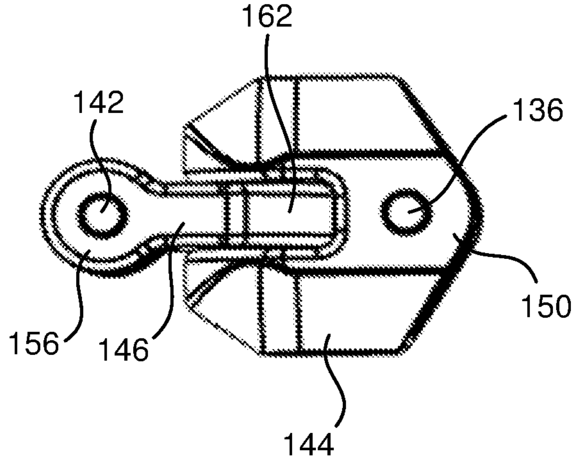
FIG. 8 is a side view of the flexible joint of FIG. 7, according to an embodiment of the present invention.

Referring to FIGS. 4 and 6, a bearing 164, such as a roller bearing, may be disposed around the second shaft 130 to provide for rotation of the second shaft 130 with respect to the second ratchet housing portion 112. In an embodiment, as shown in FIG. 6, the bearing 164 has a tapered shape that is adapted to assist with a bending load on the second shaft 130. The bearing 164 may have a first cross-sectional width or diameter proximal to the second connector 146, and a second cross-sectional width or diameter that is larger than the first cross-sectional width or diameter distal to the second connector 146. While not shown, a second bearing similar to the bearing 164 may be similarly disposed around the first shaft 128.

As discussed herein, the tool 100 is a ratchet-type wrench. However, the tool 100 can be any type of hand-held tool, including, without limitation, electrically powered or motorized tools, such as a drill, router, or impact wrench, ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A head joint for a tool with a drive mechanism adapted to apply torque to a work piece, the head joint comprising:
- a first head housing portion including a first arm;
- a second head housing portion adapted to operably receive the drive mechanism and including a second arm pivotably coupled to the first arm;
- a first shaft disposed in the first head housing portion;
- a second shaft disposed in the second housing portion and adapted to operably couple to the drive mechanism;
- a first connector pivotably coupled to the first shaft at a first pivot;
- a second connector pivotably coupled to the second shaft at a second pivot, and matingly engaged with the first connector between the first and second pivots.

2. The head joint of claim 1, wherein each of the first and second arms includes a through-hole.

3. The head joint of claim 2, further comprising a fastener disposed in the through-hole in each of the first and second arms.

4. The head joint of claim 1, further comprising a first pivot pin coupling the first connector to the first shaft.

5. The head joint of claim 4, further comprising a second pivot pin coupling the second connector to the second shaft.

6. The head joint of claim 5, wherein the first and second pivot pins are substantially parallel.

7. The head joint of claim 1, wherein the first connector includes a slot, and the second connector includes a protrusion disposed in the slot.

8. The head joint of claim 1, further comprising a bearing having a tapered shape disposed around the second shaft.

9. A tool, comprising:
- a main housing;
- a first head housing portion coupled to the main housing;
- a second head housing portion pivotably coupled to the first head housing portion;
- a drive mechanism operably disposed in the second head housing portion and adapted to apply torque to a work piece;
- a first shaft disposed in the first head housing portion;
- a second shaft disposed in the second housing portion and operably coupled to the drive mechanism;
- a first connector pivotably coupled to the first shaft at a first pivot; and
- a second connector matingly engaged with the first connector and pivotably coupled to the second shaft at a second pivot.

10. The tool of claim 9, wherein the first head housing portion includes a first arm extending away from the main housing, and the second head housing portion includes a second arm, and the first and second arms are pivotably coupled together.

11. The tool of claim 10, wherein each of the first and second arms includes a through-hole.

12. The tool of claim 11, further comprising a fastener disposed in the through-hole in each of the first and second arms.

13. The tool of claim 9, further comprising a first pivot pin coupling the first connector to the first shaft.

14. The tool of claim 13, further comprising a second pivot pin coupling the second connector to the second shaft.

15. The tool of claim 14, wherein the first and second pivot pins are substantially parallel.

16. The tool of claim 9, wherein the first connector includes a slot, and the second connector includes a protrusion disposed in the slot.

17. The tool of claim 9, wherein the drive mechanism includes a ratchet drive portion.

18. The tool of claim 9, further comprising a bearing disposed around the second shaft.

19. The tool of claim 18, wherein the bearing has a tapered shape.

* * * * *